(12) United States Patent
Roberge et al.

(10) Patent No.: US 8,165,878 B2
(45) Date of Patent: Apr. 24, 2012

(54) SYSTEM AND METHODS FOR MATCHING AN UTTERANCE TO A TEMPLATE HIERARCHY

(75) Inventors: James Roberge, Highland Park, IL (US); Jeffrey Soble, Highland Park, IL (US)

(73) Assignee: Cyberpulse L.L.C., Northbrook, IL (US)

( * ) Notice: Subject to any disclaimer, the term of this patent is extended or adjusted under 35 U.S.C. 154(b) by 222 days.

(21) Appl. No.: 12/767,239

(22) Filed: Apr. 26, 2010

(65) Prior Publication Data

US 2011/0264652 A1  Oct. 27, 2011

(51) Int. Cl.
*G10L 15/04* (2006.01)
*G10L 15/06* (2006.01)
*G06F 7/00* (2006.01)

(52) U.S. Cl. .................. 704/243; 704/251; 707/758

(58) Field of Classification Search .................. 704/7, 9, 704/200, 246, 230, 243, 251, 257; 707/758
See application file for complete search history.

(56) References Cited

U.S. PATENT DOCUMENTS

| | | | |
|---|---|---|---|
| 6,754,647 B1 | 6/2004 | Tackett et al. | |
| 7,047,195 B2 | 5/2006 | Koizumi | |
| 7,246,128 B2 * | 7/2007 | Jordahl ................................ | 1/1 |
| 2002/0072896 A1 * | 6/2002 | Roberge et al. ................. | 704/10 |
| 2002/0087310 A1 * | 7/2002 | Lee et al. ...................... | 704/251 |
| 2002/0178009 A1 | 11/2002 | Firman | |
| 2004/0249637 A1 * | 12/2004 | Baker ........................... | 704/239 |
| 2006/0200337 A1 * | 9/2006 | Cipollone et al. ................. | 704/4 |
| 2007/0055529 A1 | 3/2007 | Kanevsky et al. | |

OTHER PUBLICATIONS

Wang, Chao, et al., Language Model Data Filtering via User Simulation and Dialogue Resynthesis, 2005, Proceedings of Interspeech, Lisbon, Portugal, p. 21-24.
Hayes-Roth, Frederick & David J. Mostow, An Automatically Compilable Recognition Network for Structured Patterns, 1975, Proceedings of the 4th International Joint Conference on Artificial Intelligence, vol. 1, p. 246-252, Morgan Kaufmann Publishers Inc., San Francisco, CA, USA.
Weng, Fuliang, et al., CHAT: A Conversational Helper for Automotive Tasks, Sep. 2006, Proceedings of the 9th Conference on Spoken Language Processing (Interspeech/ICSLP), pp. 1061-1064, Pittsburgh, PA.
Riehl, Jonathan, Integration of WordNet into a Topic Selection Routine, Published online: Fall 2004.
Huang, Yinfei, et al., Language Understanding Component for Chinese Dialogue System, Oct. 2000, Proceedings of International Conference on Spoken Language Processing, p. III-1053-III-1056, Beijing, China.
Li, Yuhua, et al., A Method for Measuring Sentence Similarity and its Application to Conversational Agents, 2004, Proceedings of the 17th International Florida Artificial Intelligence Research Society Conference (FLAIRS 2004), p. 820-825, AAAI Press, Miami Beach, FL.

(Continued)

*Primary Examiner* — Hung T Vy
(74) *Attorney, Agent, or Firm* — Valauskas Corder LLC

(57) ABSTRACT

A system and methods for matching at least one word of an utterance against a set of template hierarchies to select the best matching template or set of templates corresponding to the utterance. The system and methods determines at least one exact, inexact, and partial match between the at least one word of the utterance and at least one term within the template hierarchy to select and populate a template or set of templates corresponding to the utterance. The populated template or set of templates may then be used to generate a narrative template or a report template.

20 Claims, 9 Drawing Sheets

500

OTHER PUBLICATIONS

Jokinen, Kristiina, et al., Self-Organizing Dialogue Management, 2001, Proceedings of the 2nd Workshop on Natural Language Processing and Neural Networks, p. 77-84.

Juneja, Amit & Carol Espy-Wilson, Speech Segmentation Using Probabilistic Phonetic Feature Hierarchy and Support Vector Machines, Jul. 2003, Proceedings of the International Joint Conference on Neural Networks, vol. 1, p. 676-679.

Chu-Caroll, Jennifer & Bob Carpenter, Vector-based Natural Language Call Routing, 1999, Computational Linguistics, vol. 25, No. 3, p. 361-388. MIT Press, Cambridge, MA, USA.

Niles, L., et al., A comparison of three feature vector clustering procedures in a speech recognition paradigm, 1983, Acoustics, Speech, and Signal Processing, IEEE International Conference on ICASSP, p. 765, abstract only.

* cited by examiner

The patient has a *mass* in the *lung*.

SYSTEM AND METHODS FOR MATCHING AN UTTERANCE TO A TEMPLATE HIERARCHY

FIELD OF THE INVENTION

The present invention relates generally to data-entry platforms and interactive user interfaces. In particular, the present invention relates to a system and methods for using speech recognition software to match an utterance to a template using a template hierarchy.

The system of the present invention is useful in a variety of industries including medical, sales, financial, legal, tax, insurance, aviation and research and for a variety of purposes including, at a minimum, the generation of reports.

BACKGROUND OF THE INVENTION

In many industries, there is a need to be able to quickly and accurately describe an event orally and have the information from that description accurately entered into a system to be further processed. The more accurately the system can determine what has been described or spoken, the quicker and more accurately the information can be processed and stored or used such as to generate a report.

The main obstacle to such a system involves solving the complex problem of determining what has been said, or matching the word or words of a spoken utterance to the terms of a template in order to make the correct determination.

Although such an utterance matching determination is useful in a number of industries, one of the industries that would greatly benefit from such a system is the medical industry. In the medical industry, medical professionals regularly generate reports based on review and examination pertaining to the treatment and care of a patient by providing information through a number of input methods, each of which have advantages and disadvantages. These methods include handwriting, typing, dictation and speech recognition systems, among others. Clearly, handwriting and typing are extremely slow methods of inputting information about a subject such as a patient. Further, handwriting and sometimes typing both require the person describing the situation to often look away from the subject being described. These methods are slow and usually delay the time necessary for a proper description of, for example, an examination or investigation, to occur. In the medical profession, this delay is undesirable and can further impact not only immediate patient care, particularly when the patient is in a critical condition, but also long term healthcare costs. Equally problematic is the fact that handwritten and typed information is merely text, not actionable data. In order for textual information to used, it must first be read by a human, who can then act on the information. Actionable data, on the other hand, can be acted upon by automated processes. A simple example is the time invested and mistakes made in processing a familiar handwritten prescription contrasted with the streamlined processing of a prescription entered as data into a patient's electronic medical record.

Dictation allows an individual such as a medical professional to speak the substance of the information into a recording device. From this recording, a transcript is later prepared, often manually. The person dictating typically must review the transcribed report for accuracy. Because typically someone other than the person dictating actually prepares the transcript from the recording made by the professional, errors result from the transcriber's inability to accurately identify what was said. After the professional is satisfied with the accuracy of the transcript, a final report can be prepared, although spelling and grammatical errors often also appear in the transcript and thus in the final report. In addition, it takes time for a dictated report to be transcribed, reviewed, edited, and approved for final distribution. Finally, and most importantly, the resulting transcription is merely text (to be read) not actionable data.

Further, speech recognition technologies are known for entering spoken descriptions into a computer system. These technologies permit a user, such as a medical professional, to speak into a recording device and, through the use of speech recognition software; a transcription for the medical report can be prepared. For purposes of this application, speech recognition is defined to be synonymous with voice recognition. The transcription or report that results from this process can then be revised by the professional, either on a display device (real-time or off-line) or on paper (off-line), and edited, if necessary. This approach, however, is not problem-free.

Problems with conventional speech recognition technologies include erroneous transcription. Transcription error rates typically range from 5% to 15% depending on the speaker's skill with the language used to prepare the report, the environment, and vocabulary. Equally important, speech recognition errors are unpredictable, with even simple words and phrases being misrecognized as completely nonsensical words and phrases. In order to prevent these recognition errors from appearing in the final report, the medical professional must very carefully review the transcribed report. Given the large number of reports that many medical professionals are required to prepare in a single day, they often attempt to review the transcribed text as it is produced by speech recognition software by glancing at the transcribed text on the display device while receiving or analyzing the data or image about which the transcription or report is being prepared.

In some reporting environments, however, this approach is time consuming and can cause errors in the transcribed text to be overlooked and/or cause errors to creep into the report. For example, for radiologists, the traditional approach to report preparation using speech recognition software is particularly problematic. It is not easy for a radiologist to go from examining the intricate details of an X-ray to reviewing written words, then return to examining the X-ray without losing track of the exact spot on the X-ray or the precise details of the pathology that he or she was examining before reviewing the text transcribed from his or her dictated observations. In addition, the displayed report occupies space on the display device, preventing it from illustrating other content, such as images. Finally, as with dictation, the resulting transcription is merely text (to be read) not actionable data.

Structured reporting technologies are known also. They permit, for example, a medical professional to record data about a patient using a computer user interface, such as a mouse and/or keyboard. The medical report is automatically generated from this information in real-time.

The primary problem with current structured reporting technologies is that they may require that a medical professional take an unacceptable amount of time to complete a report when using a traditional computer user interface. Medical reports often require very large structured reporting data sets. As a result, navigating these data sets may be complex and entering findings may become a lengthy process that requires time that medical professionals could use more effectively attending to other tasks, such as seeing additional patients, preparing additional medical reports, or reading medical literature.

Some structured reporting systems may include the limited use of speech recognition software to support navigation and data entry, in which a user selects an item on-screen by reading its name aloud instead of clicking it with a mouse or enters a numeric value into an on-screen data entry box by speaking it aloud instead of typing it in. While this use of speech recognition allows the reporting interface to be operated in a "hands free" manner, it does not make navigating the structured data set any faster—quite the contrary—nor does it remove the need to look at the reporting interface to see the list of available choices at each data-entry point.

Attempts have been made to improve the efficiency with which reports, including medical reports are prepared. Often these methods use what are termed "macros". A macro is a rule or pattern that specifies how a certain input sequence (often a sequence of words) should be mapped to an output sequence (also often a sequence of words) according to a defined procedure. The mapping process instantiates (transforms) a macro into a specific output sequence.

Traditional macros include simple macros and complex macros. A "simple macro" is a text string identified by a name. For example, a macro corresponding to the text string "No focal liver mass or intrahepatic duct dilatation" may be identified by the macro name "Normal liver". A "complex macro" includes at least one short cut, or placeholder, such as blank slot or pick-list, for example such as that shown in FIG. 1B. The placeholders indicate where the user may—or must—insert additional text. Some technologies that record and transcribe the spoken word utilize macros. For example, by mentioning the name of the macro in a voice command or a user interface, the associated text and placeholders are included in the medical report. The text can be then be selected on-screen and edited, and any placeholders can be selected on-screen and filled in by the medical professional to generate narrative text.

Certain simple macros and the names by which each is identified are shown in the following chart:

| Macro Name | Macro Content |
| --- | --- |
| "Right dominant" | The coronary circulation is right dominant. |
| "Normal coronaries" | The ____ coronary arteries are patent without significant disease. |
| "LAD lesion" | The left anterior descending artery has a ____ stenosis in the ____ segment. |

The macro content (right column of chart) can be orally identified to the system that is being used to prepare the report by simply mentioning the macro name (left column of chart). The system then includes the associated content (text and/or placeholders) in the report. According to this technology, the user is forced into a rigid command-like dialog. The user speaks the macro name, which the reporting system then uses to select a macro content, followed by the names of terms in various pick-lists (which the reporting system then uses to record terms from pick-lists), such as the sequence below:

Pathology: mass
Size: small
Shape: oval
Margins: smooth

Some reporting systems allow reports to be generated through the use of an extensive set of macros or a macro library. A macro library may include tens, hundreds, or even thousands of macros created, for example, by users to match a specific reporting style, or by commercial vendors and licensed as "comprehensive" macro sets. While large macro sets can be advantageous and permit a wide variety of reports to be prepared more rapidly under a wider range of circumstances, the sheer size of the library can be a significant disadvantage as memorizing all of the macro names may be simply infeasible for the user.

To lessen this problem, large macro libraries may include a user interface that categorizes macros and provides for visual navigation of the extensive macro library. However, this navigation approach has all of the disadvantages of a structured reporting user interface. Navigating an on-screen interface that categorizes the macros in the macro library takes significant time. It also requires a medical professional to remove his or her visual focus from other clinical activities, such as reviewing the medical images which are the subject of the report or even attending to a patient. Navigating an on-screen interface may be a significant distraction that may lead to errors, as well as increase the time it takes to prepare a report.

In addition, macros alone are usually insufficient to complete a medical report. Many medical reports consist of a combination of text strings recorded as macros (and perhaps subsequently edited) and unstructured free-form statements entered directly by the user (transcribed or typed).

Overall, dictation, speech recognition, and structured reporting including structured reporting using traditional macros constrain medical reporting, for example, by limiting the speed with which reports can be created and by forcing physicians to adjust their visual and cognitive focus back and forth between clinical information (e.g., images, test results, and patients) and the reporting system's user interface. Medical professionals need to be able to enter information quickly and efficiently, oftentimes so as to transmit the resulting information rapidly to other medical professionals (e.g., referring physicians).

Again, with respect to radiology, a single user may need to enter an enormous amount of information in a single day. Understanding and obtaining the information requires intense visual focus on one or more images, such as X-ray images, computed tomography ("CT") scans, magnetic resonance images ("MRI"), and ultrasound loops. Having to look away from an image to a computer user interface on which the report text or data entry interface appears, is a significant time consuming distraction that again can lead to errors and longer reporting times.

To overcome these disadvantages, an individual performing an examination, review or observation should be able to use the spoken word or utterances to enter the necessary information while continuing to perform their core task, for example, a medical professional visually examining medical images or reviewing clinical data.

Existing reporting systems organize content into a set of named macros. For example, in a radiology reporting system, a macro name is typed, selected on-screen, or spoken aloud, matched against the set of macro names, and the corresponding macro selected and recorded into memory. Matching the input name against the set of macro names is a basic text string matching problem, making this a relatively simple task. The downside to this approach is that any information to be recorded using macros must be pre-coordinated into a manageable number of named macros. Exhaustive pre-coordination of related information is obviously intractable. Covering even a modest subset of combinations would yield an impracticably large number of macros.

As a consequence, the use of macros in existing reporting systems is typically limited to pre-selected combinations such as procedure, anatomy, and patient history (disease state). In a radiology reporting system, for example, macro names include "chest x-ray", "chest x-ray asthma", "chest x-ray bronchitis", "shoulder x-ray", "pelvic x-ray".

In an effort to reduce the amount of dictation that must be performed without exploding the number of macros, some reporting systems allow a macro to include pick-lists containing additional text that can be selected with a mouse or microphone button. Unfortunately, using this feature requires that a user look at the reporting interface, and away from the image display, in order to select from the various on-screen picklists; greatly limiting the effectiveness and use of this feature.

In the case of a simple macro with no hierarchy, existing techniques based on word matching can be used to compute how well an utterance matches the macro text. A term-matching algorithm, for instance, might compute the relative match between an utterance and a macro as being equal to the percentage of terms in the macro text that are matched to a word in the utterance.

Term-matching algorithms may use the words in a given vocabulary to populate a term vector space in which each dimension corresponds to a separate word in the vocabulary. The individual dimensions of a term vector space are commonly weighted to reflect the relative infrequency with which terms are used; that is, greater weight is given to terms which occur less frequently. Given a vocabulary term vector space, a given set of terms can be represented as a term vector, where each term in the set has a non-zero (weighted) value in the corresponding dimension of the term vector. Not all words are equally important, or equally useful, when it comes to matching. Weighted term vectors are used to compute a probabilistic score of the degree to which terms match.

Somewhat more sophisticated term-matching algorithms account for the relative match between an utterance and a macro in a bidirectional manner; that is, they attempt to capture how well the macro matches the utterance in addition to how well the utterance matches the macro. In such algorithms, the relative match score is often computed as the dot product of the utterance term vector and macro text term vector. Whether a simple percentage or a dot product is used, the relative degree of the match is typically expressed as a numeric score and threshold filters are applied to categorize the accuracy of the match, such as exact match, partial match, or no match.

In the case of a complex macro that includes a term-hierarchy such as that shown in FIG. 1B, simply matching the words in an utterance against the set of terms that occur in the template, as per existing term-matching techniques, will not produce a useful result; in large part, because doing so ignores the semantics of the term-hierarchy. For example, matching the utterance "medium mass in the liver" against the set of terms in the template in FIG. 1B produces a percentage score of 0.27 and a term vector dot product score of 0.52. These low scores reflect the inclusion of all the terms in the hierarchy of the SIZE group 14 and the hierarchy of the ORGAN group 16, despite the fact that only one term can be selected from each hierarchy when filling-in the template.

An alternative existing approach is to use a finite-state automata to walk the utterance and the term-hierarchy in parallel—or, more precisely, to walk the utterance and a depth-first traversal of the term-hierarchy in parallel—attempting to match words of the utterance with terms of the term-hierarchy. Using a finite-state automata to match the utterance, "large mass in the liver" to the template in FIG. 1B begins with matching the utterance against the hierarchy of the SIZE group 14, yielding a match for "large" 15; followed by a match with "mass" 12 in the hierarchy root; and finally with a match for "liver" 17 in the hierarchy of the ORGAN group 16.

The disadvantage of matching using finite-state automata is that such techniques are critically dependent on the order of the words in the utterance precisely matching the order of the terms in the template. For example, finite-state automata matching techniques will not match the utterance "liver has a large mass" with the template shown in FIG. 1B because the word "liver" precedes the keyword "mass" in the utterance, but follows it in the template. Nor do finite-state automata approaches account for situations in which no terms match in a given hierarchy or where there are only partial matches within a given hierarchy or with the hierarchy root. These limitations become acute as the size and complexity of the term-hierarchy increases.

These disadvantages are intrinsic to the approach, but are not a disadvantage in domains in which a user is limited to reading from a scripted or prompted dialog; for example, when reading aloud a choice from among a set of displayed "fill-in-the-blank" options. These are the kinds of domains for which matching using finite-state automata has been cited in the past.

Another problem with term-based matching is that it treats each utterance and template as a simple "bag of words". For example, matching the utterance "mass in the lower right quadrant of the left breast" against the following term-hierarchy:

PATHOLOGY: mass
ANATOMY: [left breast, right breast]
LOCATION: [upper left quadrant, upper right quadrant, lower left quadrant, lower right quadrant]

using term-based matching (depicted using underlining) yields an inconclusive result with respect to the "ANATOMY" field and the "LOCATION" field because both "left breast" and "right breast" include the term "breast" which is a word of the utterance, as are both "lower left quadrant" and "lower right quadrant"—both including the terms "lower" and "quadrant" of the utterance.

Based on the disadvantages described above, there is a need for an utterance matching system that allows users, such as medical professionals, to match the words in a spoken utterance to the terms in a template hierarchy to select the best matching template or set of templates. There is a need for an utterance matching system that accounts for variation in utterance expression such as word order, grammatical form, incomplete phrasings, extraneous terms, synonymous terms, and multi-term phrasings. Therefore, there is a need for a system that operates independent of word order, form, construction or pattern of the utterance, but relies on structure, semantics and content thereby allowing a user to enter information about a subject such as a patient into a system using utterances, thereby not requiring the user to be distracted from visual focus of the subject.

SUMMARY OF THE INVENTION

The present invention pertains to a system and methods that include a set of template hierarchies used to match words of an utterance to terms of a template in order to select the best matching template corresponding to the utterance. This is referred generally herein as mapping an utterance to a template.

An advantage of the system and methods of the present invention is the proper determination of a word or utterance to a template allowing the user to perform work without looking away from the subject to which the utterance may pertain.

The present invention can be used in a number of industries. Because of the direct applications, the medical industry is used for most of the examples describing the present invention herein, although any industry is contemplated such as sales, financial, legal, tax, insurance, aviation and research. The present invention can also be used for a wide variety of purposes. Because of the direct applications, medical reports are used for most of the examples describing the present invention herein, although any purpose is contemplated.

The present invention relates to matching at least one word in an utterance to a template hierarchy to select the best matching template or set of templates. More particularly, the present invention is directed to a system and methods by which a user enters an utterance into the system and the system determines a matching correspondence based on at least one exact, inexact, and partial match between the at least one word in the utterance to at least one term within the template hierarchy. The present invention determines the matching correspondence independent of word order, form, construction or pattern of the utterance while relying on the structure, semantics and contents between the utterance and the template. This allows for variance in utterance expression such as word order and grammatical form, incomplete phrasings, extraneous terms, synonymous terms, and multi-term phrasings.

For purposes of this application, the term "utterance" refers to a word or sequence of words spoken by a user. An utterance is usually spoken aloud and the spoken speech can be converted to text by speech recognition software. Alternatively, the words in the utterance could be typed, selected onscreen, or specified by the user in some other manner. The utterance can be entered or inputted into a system through an audio pickup such as a microphone, or by entering data through standard input devices as known by one having ordinary skill in the art, for example, a mouse, keyboard or touch-screen.

According to the invention, the term "template hierarchy" refers to a hierarchy of terms and may further include a sub-hierarchy of terms. A template hierarchy is selected from a set of template hierarchies that best matches the utterance. The utterance is compared to each template hierarchy and the template hierarchy with the highest score is selected. The score of each template hierarchy in the set of template hierarchies is determined using a matching algorithm as described herein. For purposes of this application, "term" includes one or more words, phrases, sentences and further includes numbers, symbols, icons, pictures and graphics.

Once an utterance has been properly matched to a template hierarchy within a set of template hierarchies, a template can be generated such as a narrative template or a report template, a narrative or report can be quickly generated without the need of outside interaction. A "narrative template" represents narrative text such as one or more phrases, sentences, or paragraphs and may include fields denoting at least one short cut or placeholder such as a blank slot or pick-list. For example, a narrative template may be a "fill-in-the-blank" sentence in which the template corresponds to an organ and the blank slots or fields are filled with properties that describe that organ. A narrative is a representation such as a verbal or visual representation of the narrative template. A "report template" is a template that represents the structure of a report such as layout and format and may further include a narrative template or set of narrative templates associated with that report. Reports are typically a visual representation that can be generated to present, explain, or put into context various types of information including data, results of tests, information regarding procedures, and the status of the subject.

Each template of the template hierarchy includes a template hierarchical structure that is represented by nodes. More specifically, the template hierarchy of the present invention includes a widely-used data structure that emulates a hierarchical tree structure with a set of linked nodes. A root node is the topmost node in the hierarchical tree structure. According to the invention, root nodes typically signify one or more templates and nodes below the root nodes signify either fields within the one or more templates, sets of terms that can be used to populate one or more fields of one or more templates, or the root nodes of sub-hierarchies of one or more templates.

A node may also represent a separate data structure (which could be a hierarchical tree structure of its own). Each node in a tree has zero or more child nodes, which are below it in the hierarchical tree structure. A parent node is a node that has a child node whereas a leaf node—or terminal node—is a node that does not have any children.

Each node in the template hierarchy is typically bound to one or more data elements, which may be coded data elements—that is, data elements which are mapped to a database schema or coding standard. The data element is either a term or a sub-hierarchy root, wherein the sub-hierarchy root further includes nodes representing data elements. According to the invention, sub-hierarchy root nodes typically signify one or more sub-templates, which is a template within a template. It is also contemplated that the sub-hierarchy may further include data elements representing additional roots of additional sub-hierarchies, etc.

The template defines how data elements are related and can also describe how the associated narrative or report is generated from data elements populated within a template.

Selection of a template is not accomplished by matching the word order, form, construction or pattern of the utterance against a group of terms in the hierarchy. Instead, a template is selected based on how well the words in the utterance match the structure, semantics and content of the template. In addition, the structure, semantics and content of the template is used to guide the process of selecting individual nodes from the template hierarchy in order to select and populate the template.

In the preferred embodiment, the matched terms including the consideration of structure, semantics and content of the template correlate to data elements that are used to populate the template, which are then recorded for use such as to communicate the narrative template or report template. As described above, the communicated narrative template is simply termed herein as a narrative and the communicated report template is termed herein report. In certain embodiments, the invention communicates both narrative templates and report templates or a combination of both.

The present invention utilizes a matching algorithm with a scoring metric to determine exact, inexact, and partial matches of terms in the template hierarchy including any terms within any sub-hierarchies. The matching algorithm accounts for instances where only portions of the utterance match any terms of a hierarchy and any sub-hierarchies.

The preferred embodiment takes the problem of matching the utterance against each template hierarchy of the set of template hierarchies and decomposes it into a set of sub-problems in which the utterance is matched against each of the terms of the template hierarchy and sub-hierarchies. The decomposition process continues recursively downward through the template hierarchy until a leaf node is reached, where each leaf node requires scoring the relative match between the terms of the leaf node and the words of the utterance.

The resulting score of the terms of each template hierarchy to the words of the utterance is propagated upward in the template hierarchy and used to compute scores for successively higher terms of non-leaf nodes, where each hierarchy and sub-hierarchy is scored after being populated in the template. In embodiments that include a template hierarchy with sub-hierarchies, the highest-scoring term or set of terms of each template sub-hierarchy is selected and passed upwards. This upward propagation and refinement of matching terms continues until the root node is encountered, whereupon the populated template is scored against all the words in the utterance, resulting in a total score for the template including all sub-hierarchy terms. The present invention applies this hierarchical matching process to a set of template hierarchies, including all of their sub-hierarchies, and selects the highest-scoring populated template.

In the event where two or more templates achieve the same score, a set of threshold filters and ranges are used to classify the populated templateswith the same score according to exact matches, inexact matches and partial matches. Then the template with the most exact match is recorded or the set of inexact or partially matching populated templates displayed for the user to review, select, and edit.

According to the present invention, a template hierarchy is selected from the set of template hierarchies based on scoring, with the highest scoring template selected. A score is determined as the template corresponding to each template hierarchy is filled-in, with the terms of the hierarchy corresponding to the words of the utterance. As an example, given the utterance "small mass that looks round" and the following pathology template in the template hierarchy:

(PATHOLOGY)=[SIZE][SHAPE] mass the system decomposes the problem of matching the utterance to the template hierarchy into two problems, or sub-problems. Each term in the set of terms in each template hierarchy or sub-hierarchy is represented by a term vector. Each word in the set of words in the utterance is similarly represented by a term vector. The degree to which an utterance matches a given template hierarchy or sub-hierarchy is obtained based on the intersection and dot product of the utterance term vector and the template term vector.

In the example above, the template hierarchy of the [SHAPE] field includes three terms: small, medium, large and the template hierarchy for the [SHAPE] field includes three terms: oval, round, tubular. The utterance is first matched against the template hierarchy for the [SIZE] field, which yields the match "small" with a term vector dot product score of approximately 1.0, which signifies a perfect match. Second, the utterance is matched against the template hierarchy for the [SHAPE] field, which yields the match "round" with a term vector dot product score of approximately 1.0, which signifies a perfect match. Lastly, the utterance is matched against the entire template after filling-in or populating the template with the data elements obtained for the [SIZE] and [SHAPE] sub-problems above, where said data elements may be coded data elements. Population of the template is accomplished by recursively traversing the template hierarchy and selecting the highest scored matched result for each hierarchy and sub-hierarchy. The populated template has the following associated data elements:

SIZE=small
SHAPE=round
PATHOLOGY=mass

The utterance is matched against the populated template "small round mass", which yields a term vector dot product or total score of approximately 1.0, signifying a perfect match to the template. The term vector dot product is computed using the term vector corresponding to the set of terms in the populated template hierarchy and the term vector corresponding to the set of terms in the utterance. In the example above, the template is an exact match. In instances where the populated template is not an exact match, the utterance may be matched against additional templates, the results reviewed and the populated template with the highest score is selected. Upon selecting the populated template with the highest score, the resulting data elements (which may be coded data elements) are recorded into memory such that the narrative template "small round mass" is available for communication to the user such as audibly through a speaker or visually through a display.

Again, depending on the score of the matching correspondence, at least one template populated with the terms of the template hierarchy corresponding to the words of the utterance is selected and recorded for communication audibly through a speaker or visually through a display.

Although the invention has been described above with reference to a matching algorithm that includes a scoring metric, it is contemplated alternative embodiments may implement Boolean metrics (i.e., true/false) or a non-recursive or non-deterministic process—such as a neural network, genetic algorithm, or support vector machine ("SVM")—to match the words in the utterance with the terms of the template hierarchy.

It is an objective of the present invention to utilize a matching algorithm that correlates the words of a spoken utterance to terms of a narrative template within a template hierarchy. For example, a radiologist might invoke a template with the utterance "small mass invading the liver, round, more dense than fat". The matching algorithm uses the words in this utterance to select and populate the appropriate narrative template or, more precisely, to populate the narrative template with the data elements corresponding to the terms of the template.

It is another objective of the present invention to utilize a matching algorithm that correlates the words of a spoken utterance to terms of a report template within a template hierarchy. As an example, a radiologist might invoke a report template with the utterance "two view chest x-ray". Based on these words, the algorithm identifies the "chest x-ray" procedural report template including layout and format. The radiologist then completes the report template with a series of utterances, which are then correlated to associated narrative templates. The reporting system then records the associated data elements and the resulting narrative template automatically populates the previously selected report template.

It is contemplated that a user could use the present invention to select a template and then edit the template selected termed herein as "by exception". For example, a "normal" template is selected for a chest x-ray and then the "normal template" is edited to customize the information to the present findings. More specifically, a radiologist could enter into the system the utterance "normal two view chest x-ray". The matching algorithm utilizes the template hierarchy to select and populate a report template that includes all terms associated with a "normal" template including one or more narrative templates. The radiologist then inputs a series of utterances that are matched to narrative templates that replace portions of the "normal" report template such as specific normative findings with identified abnormalities. The present invention uses the data elements recorded within the templates to automatically position the edited information in the report template; for instance, to automatically replace the normative impression "negative chest x-ray" with an impression related to the observed abnormality such as "findings consistent with chronic bronchitis".

An objective of the present invention is to allow a user to easily verbalize information including data through utterances pertaining to a particular subject while maintaining visual focus on the subject or on another subject, for example, a radiologist can look away from the display device while utilizing the system. The user enters the spoken words or utterances into the system through an input device, upon which the system ultimately provides a narrative text or report layout and format in an efficient manner.

An objective of the present invention is to match the words of a spoken utterance against the terms in a template hierarchy in such a way as to allow for normal variations in human expression such as differences in word order and grammatical form, incomplete phrasings, extraneous terms, synonymous terms, and multi-term phrasings.

Another objective of the present invention is to provide a matching algorithm that takes into account information that was previously recorded when matching a current utterance to a template within the template hierarchy.

Another objective of the present invention is to allow a user, such as a radiologist, to record clinical observations in a more natural manner and not be forced into a rigidly structured dialog, such as a sequence of identifier and value pairs.

The present invention and its attributes and advantages will be further understood and appreciated with reference to the detailed description below of presently contemplated embodiments, taken in conjunction with the accompanying drawings.

DETAILED DESCRIPTION OF EMBODIMENTS OF THE INVENTION

The present invention is a system and methods that receives an utterance made by a user, such as a medical professional, and matches the words in that utterance against at least one template in a set of templates to select the best matching template or set of templates.

The present invention allows a user to invoke a template and record words that populate the template using a single utterance or, optionally, a sequence of utterances. The present invention allows a user to speak information in a natural manner using customary phrasing and varying word orders. The invention then uses the words in the utterance to both select and populate the appropriate template.

As described herein, the present invention utilizes an algorithm to correlate the words of the spoken utterance to a template within a template hierarchy. The algorithm correlates the words of the utterance to the terms of a template by identifying the degree to which the utterance aligns with the contents, construction, pattern and semantics of the template. In addition, the algorithm selects nodes—specifically data elements or in certain embodiments coded data elements—of the template hierarchical structure to populate the template.

One of the key features of this reporting workflow is that it takes place without forcing a user, such as a radiologist, to look away from the image display. The radiologist simply speaks and the algorithm matches the words of each utterance against terms in the various narrative templates or report templates. The system then selects the templates to be populated and records the associated data elements.

Figures 1A, 1B:
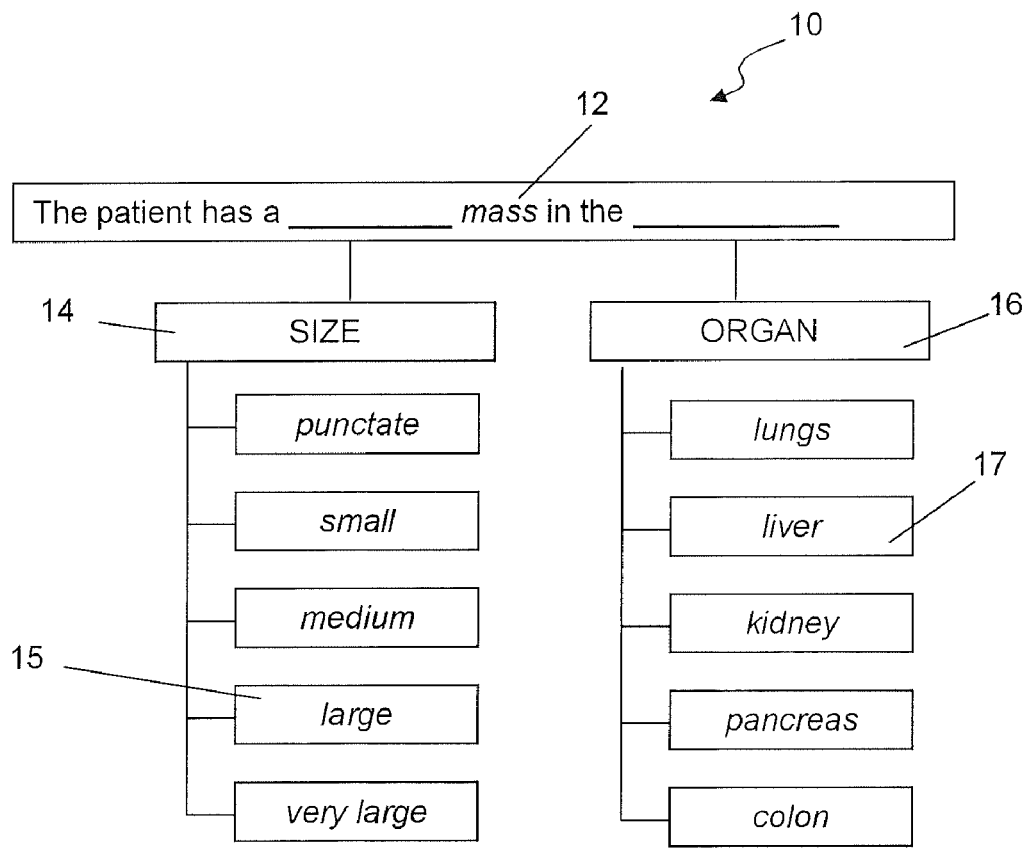
FIG. 1A illustrates a template without a term-hierarchy in accordance with existing techniques.
FIG. 1B illustrates a term-hierarchy in accordance with existing techniques.
Figure 2:
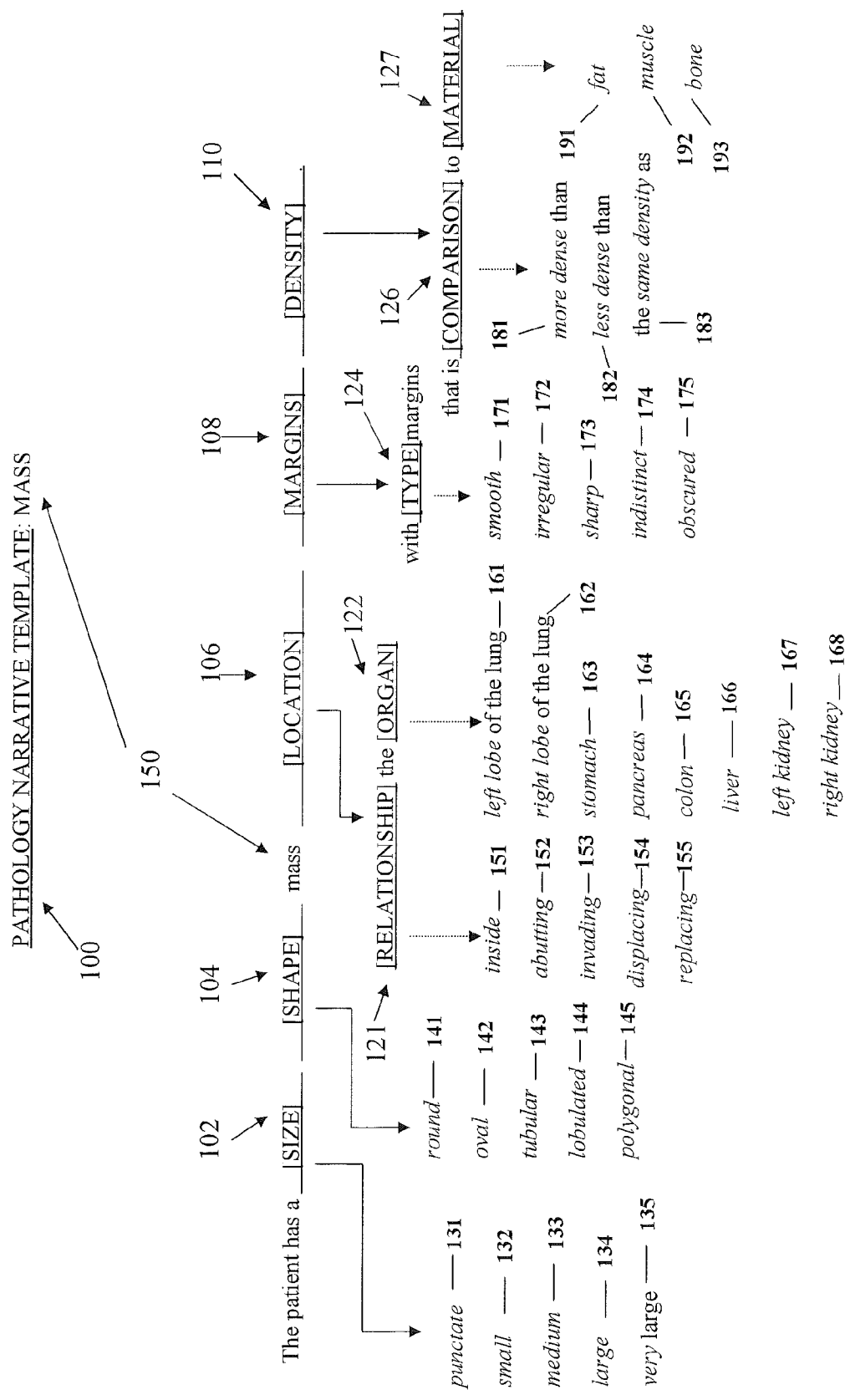
FIG. 2 illustrates an embodiment of a narrative template of a set of template hierarchies according to the present invention.

FIG. 2 illustrates an embodiment of a narrative template 100 of a set of template hierarchies according to the present invention. As shown, the template 100 includes a hierarchy of terms for the [SIZE] field 102 and [SHAPE] field 104 and a sub-hierarchy of terms for the [LOCATION] field 106, [MARGINS] field 108 and [DENSITY] field 110. A user such as a radiologist might invoke the narrative template 100 shown in FIG. 2 with the utterance "small mass invading the liver round more dense than fat". The matching algorithm uses the words in this utterance to populate, select, and record the best matching template. More precisely, words of the utterance are matched to corresponding terms of the template hierarchy including any sub-hierarchies of the template 100, yielding the following data elements:

[PATHOLOGY] 100: mass 150
[SIZE] 102: small 132
[SHAPE] 104: round 141
[LOCATION] 106:
[RELATIONSHIP] 121: invading 153
[ORGAN] 122: liver 166
[MARGINS] 108:
[TYPE] 124: blank
[DENSITY] 110:
[COMPARISON] 126: more dense than 181
[MATERIAL] 127: fat 191

It should be noted that the [MARGINS] field 108 returned no matches and is left blank.

As mentioned above, the present invention determines the matching correspondence independent of word form or word order of the utterance such that utterance "round mass small more dense than fat invading the liver" yields the same result.

The data elements corresponding to the terms 132, 141, 153, 166, 181, 191 are used to populate the template such that the utterance is matched to the populated template. The populated template is determined to be the best match to the utterance and recorded to generate the narrative template "The patient has a small 132 round 141 mass 150 invading 153 the liver 166 that is more dense 181 than fat 191". The narrative template 100 may then be communicated to the user such as audibly through a speaker or visually through a display.

The narrative template 100 of FIG. 2 may also be used to match the utterance: "the left kidney appears to be invaded by a mass that is round and large" yielding the following populated template: "The patient has a large 134 round 141 mass 150 invading 153 the left kidney 167" despite the following (natural) variations in expression by the user: (1) the order of the words in the utterance is reversed from the order in which the terms appear in the template hierarchy, (2) the word "invaded" is used in the utterance, while the template hierarchy includes the term "invading", (3) the utterance includes extraneous terms such as "appears" and "that is", (4) the utterance fails to include information present in the template; in particular, the utterance does not contain any words relating to the [MARGINS] 108 and [DENSITY] 110 sub-hierarchies, and (5) the utterance and the template use the multi-term phrase "left kidney".

The matching algorithm adjusts the scoring metric to account for partial matches between words of the utterance and terms within the template hierarchy including sub-hierarchies. In addition, the matching algorithm considers the structure, semantics and content of the template through each sub-hierarchy, and in particular, the matching algorithm accounts for the number of terms that can be selected in a given sub-hierarchy. In FIG. 2, for instance, the [RELATIONSHIP] sub-hierarchy 121 allows the selection of exactly one item (single-valued), while the [SIZE] hierarchy 102 allows the selection of zero or one item (nullable single-valued) and the [TYPE] sub-hierarchy 124 allows the selection of multiple terms (multi-valued).

Figure 3:
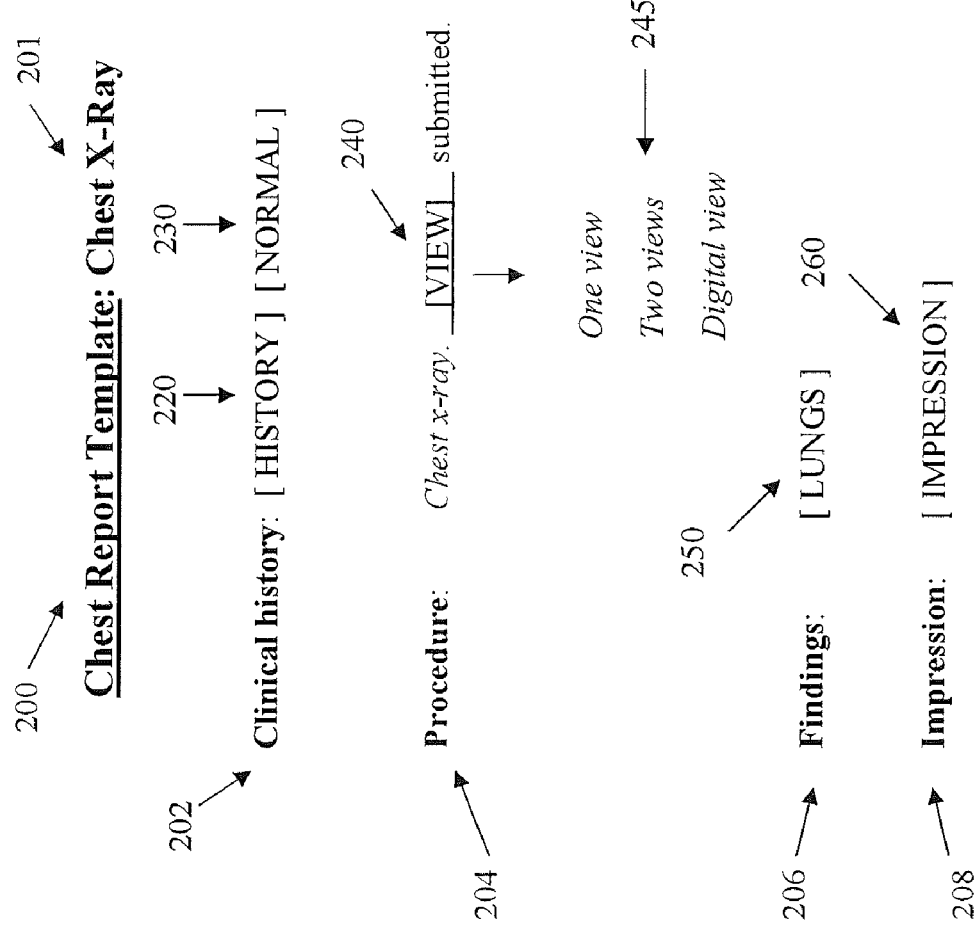
FIG. 3 illustrates an embodiment of a report template of a set of template hierarchies according to the present invention.
Figure 4:
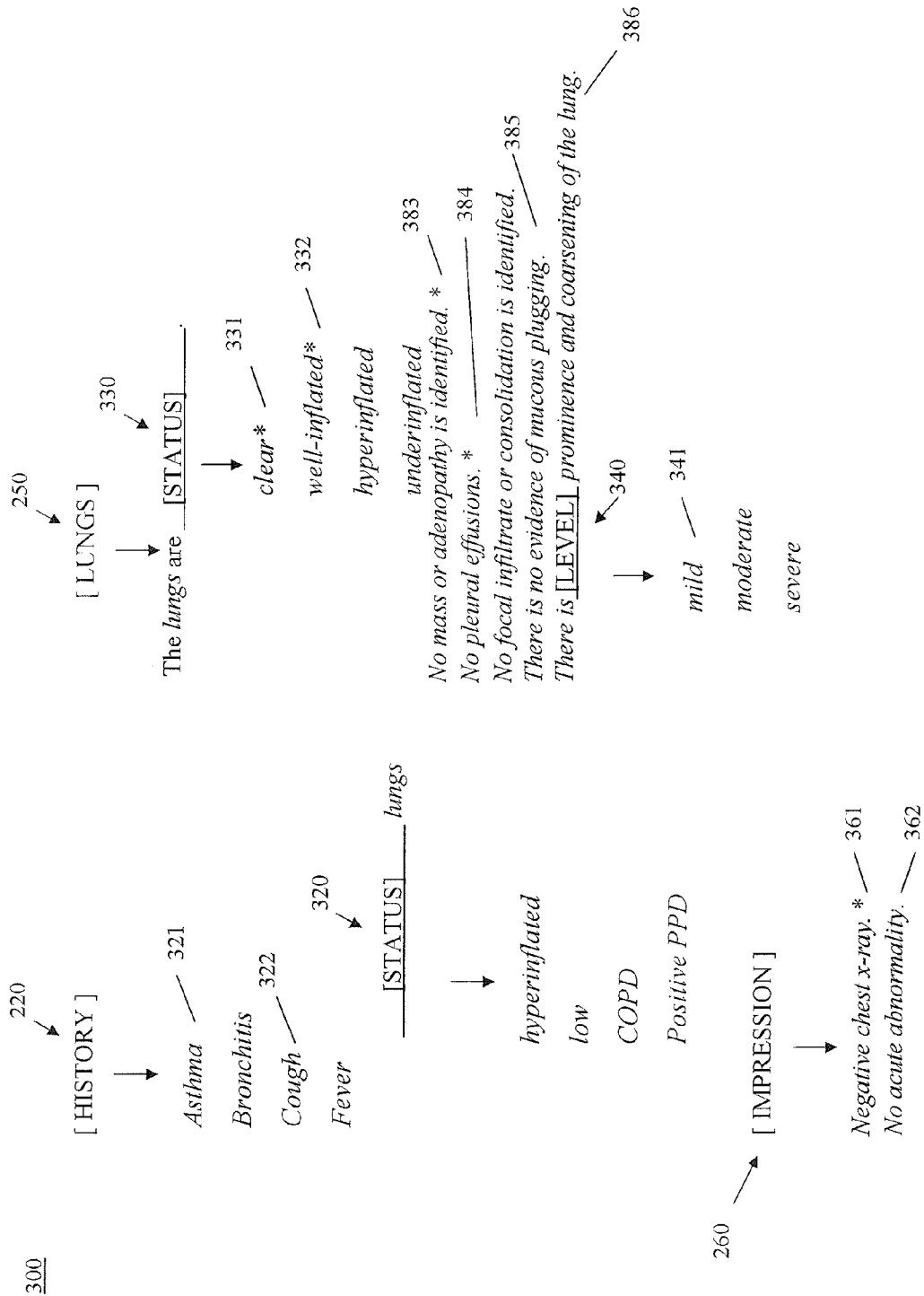
FIG. 4 illustrates an embodiment of a set of narrative templates of a set of template hierarchies placed within the report template of FIG. 3 according to the present invention.

FIG. 3 illustrates an embodiment of a report template 200 and FIG. 4 illustrates an embodiment of a set of narrative templates 300 placed within the report template 200 of FIG. 3 according to the present invention. More specifically, FIG. 3 illustrates a report template 200 for a chest x-ray procedure 201, including support for variations in the number/type of views acquired and placeholders for additional narrative templates regarding clinical history 202, procedure 204, findings 206, and impression 208. FIG. 4 is one example of the narrative templates 300 used to populate the report template 200, where the bracketed fields 220, 250, 260 denote where the associated narrative templates 300 should be placed within the report template 200.

A user such as a radiologist might invoke the report template 200 illustrated in FIG. 3 with the utterance "two view chest x-ray". Based on these words, the algorithm identifies the "chest x-ray" procedural report template 200 and populates the [VIEW] field 240 with the terms "two views" 245. The radiologist may then complete the report template 200 with the following series of utterances:
   history asthma
   clear well-inflated lungs
   no mass
   no pleural effusions
   negative chest
which are then matched to the associated narrative templates 300 shown in FIG. 4. Matching these utterances to narrative templates 300 associates the words of the utterances to the terms of the template hierarchy, which are represented by data elements:
   [HISTORY] 220: Asthma 321
   [LUNGS] 250:
   [STATUS] 330: clear 331
     well-inflated 332
     no mass or adenopathy is identified 383
     no pleural effusions 384
   [IMPRESSION] 260: Negative chest x-ray. 361
and selects the terms along with the corresponding data elements of the template hierarchy to populate the narrative templates 300. The data elements assist with positioning the narrative templates 300 in the correct positions within the report template 200:
   Clinical history 202: Asthma 321.
   Procedure 204: Chest x-ray. Two views 245 submitted.
   Findings 206: The lungs are clear 331 and well-inflated 332. No mass or adenopathy is identified 383. No pleural effusions 384.
   Impression 208: Negative chest x-ray 361.

Alternatively, a radiologist could report "by exception" using the utterance "normal two view chest x-ray", which the algorithm matches to the report template 200 in FIG. 3, including populating the findings 206 specified by the [NORMAL] field 230. The normal template includes the terms of the template hierarchy denoted by "*" in FIG. 4 such that the report template 200 is:
   Clinical history 202: [HISTORY] 220
   Procedure 204: Chest x-ray. Two views 245 submitted.
   Findings 206: The lungs are clear 331 and well-inflated 332. No mass or adenopathy is identified 383. No pleural effusions 384.
   Impression 208: Negative chest x-ray 361.
Deviations from the normal template are then specified by the utterances:
   history cough
   mildly prominent lung markings
   no mucus plugging
   no acute abnormality
which are matched to the associated narrative templates 300, wherein the data elements associated to the terms of the template hierarchy populate the report 200:
   Clinical history 202: Cough 322.
   Procedure 204: Chest x-ray. Two views 245 submitted.
   Findings 206: The lungs are clear 331 and well-inflated 332. There is no evidence of mucous plugging 385. There is mild 341 prominence and coarsening of the lung 386. No mass or adenopathy is identified 383. No pleural effusions 384.
   Impression 208: No acute abnormality 362.
The data elements are used to automatically position these new findings in the report template 200 and to automatically replace the [IMPRESSION] 260 "Negative chest x-ray" 361 with the [IMPRESSION] 260 "No acute abnormality" 362.

Figure 5:
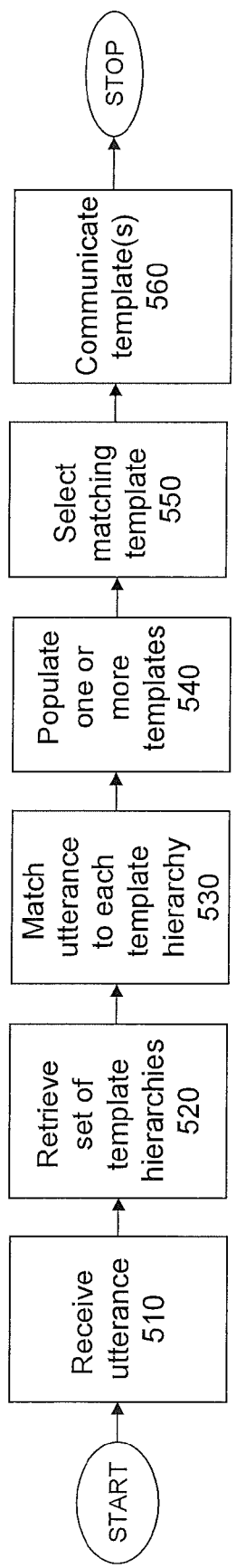
FIG. 5 is a flowchart of an embodiment of matching an utterance to a set of template hierarchies based on a matching algorithm according to the present invention.

FIG. 5 is a flowchart 500 of an embodiment of matching an utterance to a template of a set of template hierarchies based on a matching algorithm according to the present invention. The system receives the utterance from an input device such as a microphone, touch-screen or any other input device known to those skilled in the art at step 510. A set of template hierarchies is retrieved at step 520 from a database, which may reside on a local or remote computer. Each template hierarchy of the set includes a hierarchy of terms associated with at least one template and may further include at least one sub-hierarchy of terms. At least one word of the utterance is compared to at least one term of the template hierarchy to determine a match 530. A score is calculated based on at least one exact, inexact, and partial match between the words of the utterance and the terms of the template hierarchy. More specifically, the score is determined by representing a term in the template hierarchy as a term vector and obtaining an utterance term vector based on the match between a word of the utterance and a term of the template hierarchy. The score is provided for the term of the template hierarchy based on the match between the term vector and utterance term vector. The term with the highest score is selected from the template hierarchy. A template is populated at step 540 with data elements, which may be coded data elements, that correspond to the terms of the template hierarchy and a total score is computed based on the match between all words of the utterance to the populated template. More specifically, the total score is computed by taking the dot product of the populated template term vector with the utterance term vector. The total score determines the generation of a narrative template or a report template. One or more templates are selected at step 550 based on the total score and the populated template is recorded for communication to the user. In the event two or more templates return similar total scores, the populated templates are classified according to one or more exact matches, inexact matches and partial matches within the populated template. The template is communicated at step 560 to the user by either presenting the template audibly or visually.

Figure 6:
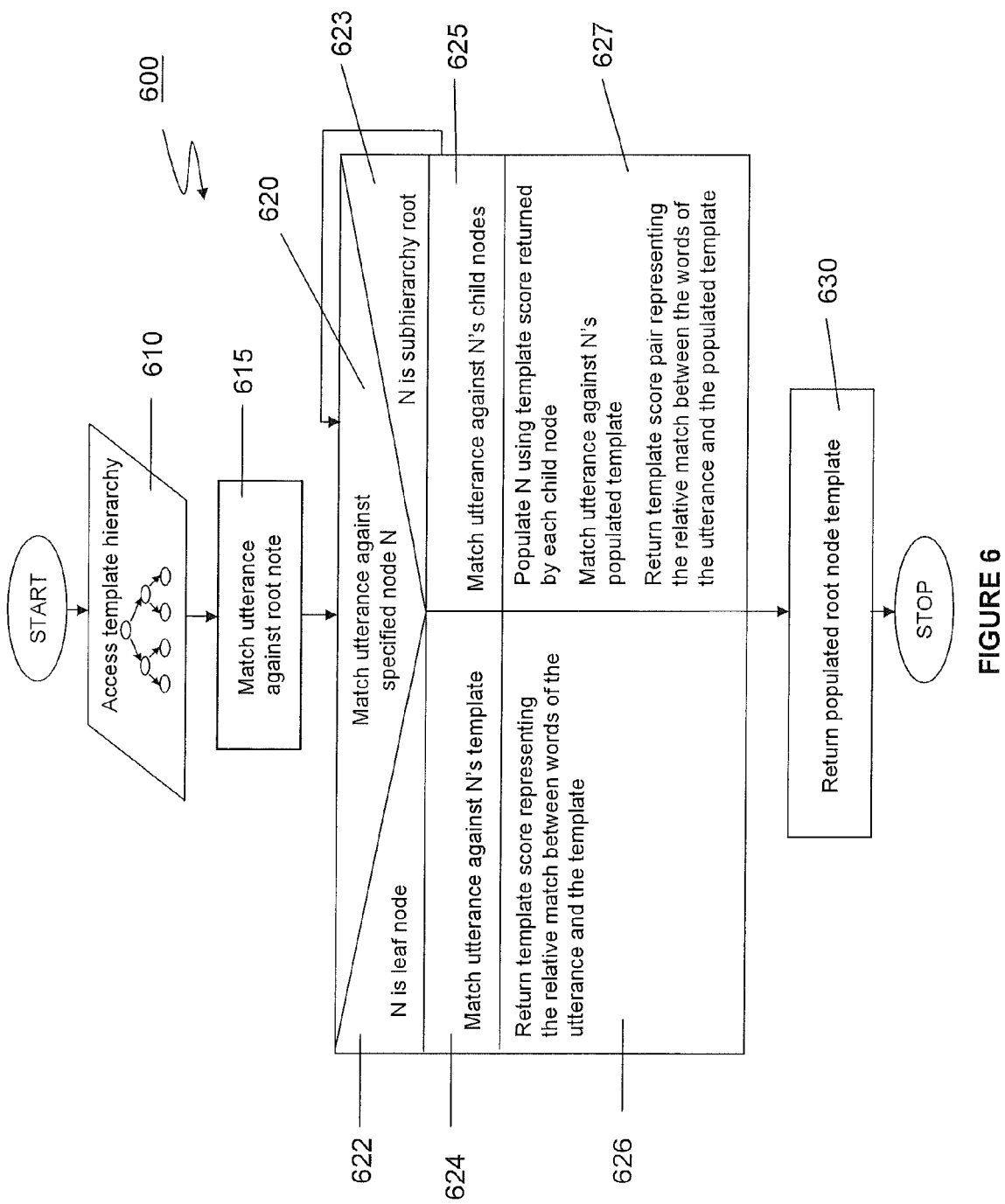
FIG. 6 is a flowchart of an embodiment of matching an utterance to a template of a set of template hierarchies based on a matching algorithm according to the present invention.
Figure 7:
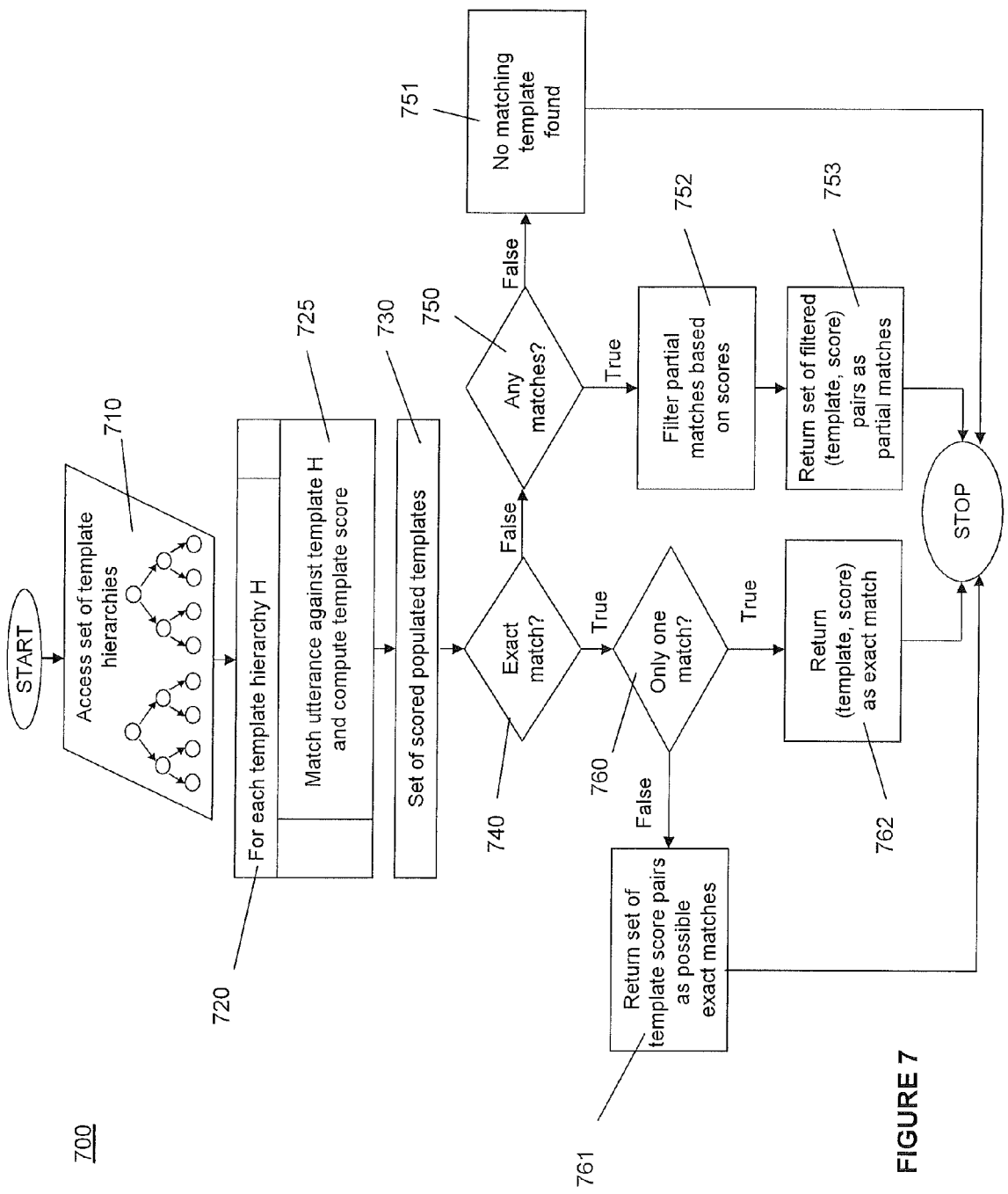
FIG. 7 is a flowchart of another embodiment of matching an utterance to a set template hierarchies based on a matching algorithm according to the present invention.

FIG. 6 is a flowchart 600 of an embodiment of matching an utterance to a template of a set of template hierarchies and FIG. 7 is a flowchart 700 of an embodiment of matching an utterance to a set of templates based on a matching algorithm according to the present invention.

Initially, a word of the utterance is matched against a root node of the template hierarchy 615, thereby initiating a recursive matching process downward through the nodes in the hierarchy 620. At each step in the recursive matching process, a determination is made whether the words of the utterance match a leaf node 622 or a root of a sub-hierarchy 623. If the specified node is a leaf node 622, the utterance is matched against the template and a score representing the relative match between the words of the utterance and the template of the template hierarchy is computed 624. The template and its score are then returned back up the hierarchy 626. Once the recursive matching process initiated by the root node of the template has completed, the resulting populated root node template, containing the populated root node template is returned 630.

If the specified node is a root of a sub-hierarchy 623, the utterance is matched against the template of each child node and a score representing the relative match between the words of the utterance and the template for each child node of the template hierarchy is computed 625, thereby continuing the recursive matching process further downward through the template hierarchy. The templates are then populated with the matching templates of each child node based on their scores and the utterance is then matched against the node's populated template and a score representing the relative match between the utterance and the populated template is computed with the populated template being returned back up the hierarchy 627. Once the recursive matching process initiated by the root node of the template has completed, the resulting populated root node template containing the populated root node template is returned 630.

As shown in FIG. 7, a template hierarchy is accessed 710. For each template in a set of template hierarchies 720, the words of the utterance are matched and a score computed 725. The matching process uses the recursive matching process as described above in reference to FIG. 6 to match the utterance against each of the template hierarchies in the set of template hierarchies. A set of scored populated template templates are returned 730 requiring further classification based on a single exact match (to the utterance), multiple exact matches, a partial match (or matches), or no match.

The system then checks whether the set of scored populated templates contain a phrase whose score is classified as being an exact match to the utterance 740. If there is an exact match, the system checks if there is only one such match 760. If so, the matching populated template and its score are returned as an exact match 762. If not, the system returns the set of matching populated templates and their scores as possible exact matches 761. If set of scored populated templates do not contain an exact match 740, the system checks for partial matches 750. If there are no matches, the system indicates that no matching template was found 751. If one or more partial match were found 750, then the system filters these partial matches based on their scores 752 and returns the set of filtered populated templates and their scores as partial matches 753.

The preferred embodiment of the present invention uses weighted term vector dot products to score the match between an utterance and one or more templates of a template hierarchy including any sub-hierarchies. Given an utterance q and a phrase $p_N$ associated with a sub-hierarchy $H_N$, the relative match between q and $P_N$ is assigned a score equal to the weighted dot product of the term vector for $p_N$ and the term vector for $q \cap H_N$, where $q \cap H_N$ denotes the set of terms that occur in both utterance q and (at least) one of the nodes in sub-hierarchy $H_N$. The weight of each term in the term vector is inversely related to its document frequency, that is, uncommon terms are assigned higher weights.

For example, given the utterance "very large mass invading the left lobe of the lung" and the template shown in FIG. 2, the matching process described above (and shown in FIG. 6) would progress through the following steps:

Step 1: The union of the terms in the hierarchy of the [SIZE] field 102 yields the term vector ⟨ punctuate 131, small 132, medium 133, large 134, very 135 ⟩. Intersecting this with the utterance yields the term vector ⟨large 134, very 135 ⟩. Taking the dot product of this term vector with the term vectors of each of the child nodes in the hierarchy of the [SIZE] field 102 and selecting the child with the maximum dot product score returns the result "very large", which is propagated upwards to the root template.

Step 2: The union of the terms in the sub-hierarchy of the [RELATIONSHIP] field 121 yields the term vector ⟨ inside 151, abutting 152, invading 153, displacing 154, replacing 155 ⟩. Intersecting this with the utterance yields the term vector ⟨ invading 153 ⟩. Taking the dot product of this term vector with the term vectors of each of the child nodes in the sub-hierarchy of the [RELATIONSHIP] field 121 and selecting the child with the maximum dot product score returns the term "invading", which is propagated upwards to the [LOCATION] field 106.

Step 3: The union of the terms in the sub-hierarchy for the [ORGAN] field 122 yields the term vector ⟨colon, kidney, left, liver, lobe, lung, pancreas, right, stomach⟩. Intersecting this with the utterance yields the term vector ⟨ left, lobe, lung ⟩. Taking the dot product of this term vector with the term vectors of each of the child nodes in the sub-hierarchy of the [ORGAN] field 122 and selecting the term with the maximum dot product (score) returns the result "left lobe of the lung", which is propagated upwards to the [LOCATION] field 106.

Step 4: The hierarchy of the [LOCATION] field 106 uses the results propagated upwards from the [RELATIONSHIP] field 121 and [ORGAN] field 122 and returns the instance "invading the left lobe of the lung", which is propagated upwards to the root template.

Step 5: Finally, the root template returns the populated template "The patient has a large mass invading the left lobe of the lung". Taking the dot product of the term vector for this populated template and the term vector for the utterance yields a score indicative of an exact match.

The matching algorithm used in the preferred embodiment accounts for variations in the number of terms that can (or must) be selected in a given hierarchy or sub-hierarchy. For example, the algorithm will match the utterance "mass invading the left lobe of the lung" with the template shown in FIG.

2 (using steps 2-4 above) despite the fact that this utterance does not include any word matching the terms within the template hierarchy of the [SIZE] field 102. Similarly, the utterance "large mass left lung," which does not match any terms of the [RELATIONSHIP] field 121 and is missing the term "lobe", will yield the following steps:

Step 1: The hierarchy of the [SIZE] field 102 returns the term large 134.

Step 2: The sub-hierarchy of the [RELATIONSHIP] field 121 does not return a match.

Step 3: The sub-hierarchy of the [ORGAN] field 122 returns the term left lobe of the lung 161 because the utterance's inclusion of "left" and "lung" are sufficient to trigger a match for this term.

Step 4: The hierarchy for the [LOCATION] field 106 uses the results returned by the [RELATIONSHIP] field 121 and [ORGAN] field 122 and returns the term left lobe of the lung 161.

Step 5: The root template returns the populated template "The patient has a large mass [RELATIONSHIP] the left lobe of the lung with a score indicative of a certain match regarding the template, but with an indication of missing content: [RELATIONSHIP] field 121. Note that the semantics of the template are that a value for the [RELATIONSHIP] field 121 is expected once the user has provided information regarding the [ORGAN] field 122, but that the [MARGIN] field 108 and [DENSITY] field 110 are allowed to have no values (unpopulated).

Although the preferred embodiment of the present invention utilizes a matching algorithm based on probabilistic scores derived from weighted term vector dot products, alternative embodiments of this invention might use Boolean metrics (true/false) or other non-probabilistic scoring metrics. In addition, alternative embodiments might use a non-recursive or non-deterministic matching process, such as a neural network, genetic algorithm, or support vector machine ("SVM"), to match the terms in the utterance with the template hierarchy.

Figure 8:
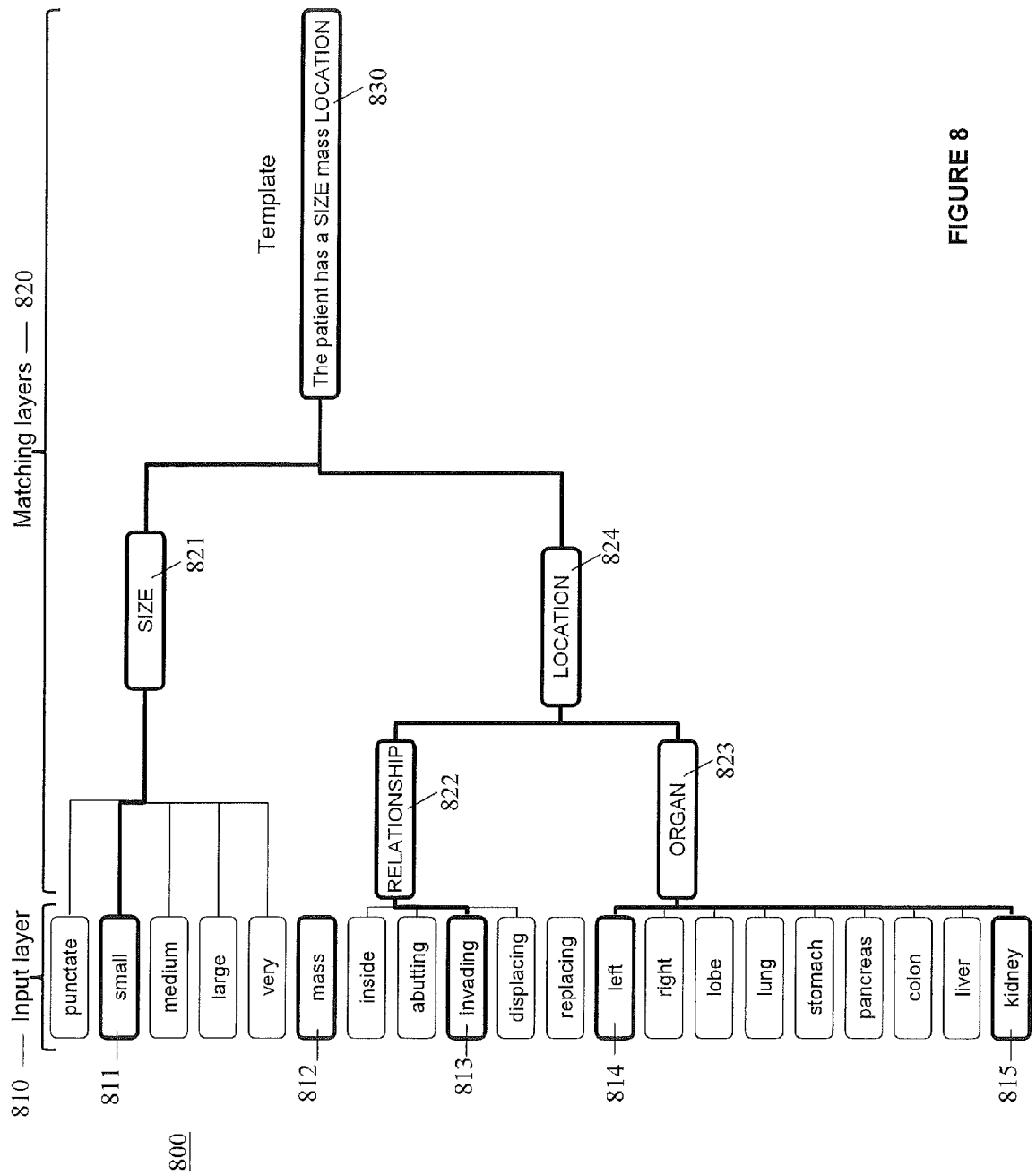
FIG. 8 illustrates an alternate embodiment of matching an utterance to a template of a template hierarchy based on use of an activation network according to the present invention.

For instance, FIG. 8 illustrates an alternate embodiment of matching an utterance to a template of a set of template hierarchies based on use of an activation network. The activation network 800 represents the hierarchies of the [SIZE] field 102, [SHAPE] field 104, and [LOCATION] field 106 portion of the template 100 shown in FIG. 2. In this case, the matching process entails modeling the flow of energy from the nodes in the input layer 810 through the nodes in the matching layers 820, where the output of a node in the matching layer 820 depends upon which (and how many) of its inputs are activated, as well as the degree to which each input is activated. In the example shown, the utterance "left kidney invaded by small mass" activates the nodes 811, 812, 813, 814, 815, in the input layer 810. This energy then flows through the matching layers 820 activating the SIZE node 821, RELATIONSHIP node 822, ORGAN node 823, and LOCATION node 824, and ultimately activating the node 830 corresponding to the template. In addition to modeling the flow of energy through the network 800, the matching layer 820 must track the flow of terms through the network 800 in order to populate the template.

When the nodes in the template hierarchy contain a phrase, the matching algorithm parses the utterance into the phrases, for example, "lower right quadrant", and "left breast". Matching these phrases against the phrases in the template hierarchy yields appropriate matches. In the preferred embodiment, the system and methods use phrase-based matching by representing phrases using a domain-specific language ("DSL"). The template hierarchy and utterances are parsed during the matching process using a DSL parser. It is contemplated that alternate embodiments of the present invention may use approaches that are more explicit such as a list of phrases or more implicit or domain-specific such as medical grammars.

Since there are significant variations in the terminology used by different users such as a cardiologist versus radiologist, the present invention allows synonymous phrases to be used when referring to terms in the template hierarchy, thereby allowing users to create reports using familiar terminology while producing a standardized report terminology.

Instead of using a single utterance "small oval mass in the left lobe of the lungs, smooth sharp margins, less dense than fat," a radiologist might naturally express these concepts using the following three separate, but intrinsically related, utterances:

(1) small oval mass in the left lobe of the lungs
(2) margins are smooth and sharp
(3) less dense than fat and reasonably expect that the context of the last two utterances will be inferred by the system from the first utterance. More particularly, the system will infer the context of the last two utterances from the word "mass" in the first utterance.

The preferred embodiment of the invention supports identification of the current reporting context, including contexts arising from the template hierarchy ("mass" in the example above), the report template (e.g., the section of the report in which the last finding was recorded), and the global report context (e.g., the type of imaging study being reported upon). The result is a set of nested reporting contexts. The algorithm then scores each utterance against each of these contexts, adjusting the scoring metrics to account for data previously recorded in a given context. In addition to these reporting contexts, the algorithm may use a broader set of contexts to adjust the scoring metrics, including: information known about the particular patient such as information from the current study, prior studies, or the patient's medical record; information known about the particular user such as the user's prior preferences when selecting templates for various medical procedures/studies, groups of patients, or medical conditions; information known about all patients at a given institution (e.g., hospital) or set of institutions; information known about the set of all users at a given institution or set of institutions; and information regarding the results of prior template matches (e.g., whether they were accepted or rejected) for a particular patient or set of patients or a particular user or set of users.

Every radiology report has information that can, and should, be recorded as data elements. According to the present invention, the data elements are used to capture findings that represent useful information and use of dictated narrative complements the data element structure. The mechanics of supporting dictated narrative are easy, requiring nothing more than standard speech recognition. The present invention maintains the current reporting context and combines information about the current reporting context with an analysis of the terms in the dictated narrative to determine the appropriate location in the report template at which to place the dictated narrative.

Radiologists using report templates will invariably adapt to the idiosyncrasies of the algorithm, as is often done with any software product. The present invention could use automated learning, in particular, reinforcement learning, to produce an algorithm that automatically adapts to radiologists on a peruser and permodality basis such as adjusting the term weights or algorithms that modify the term vectors themselves by adding/removing terms, marking terms as "required" or "must not include", or adding synonyms.

Figure 9:
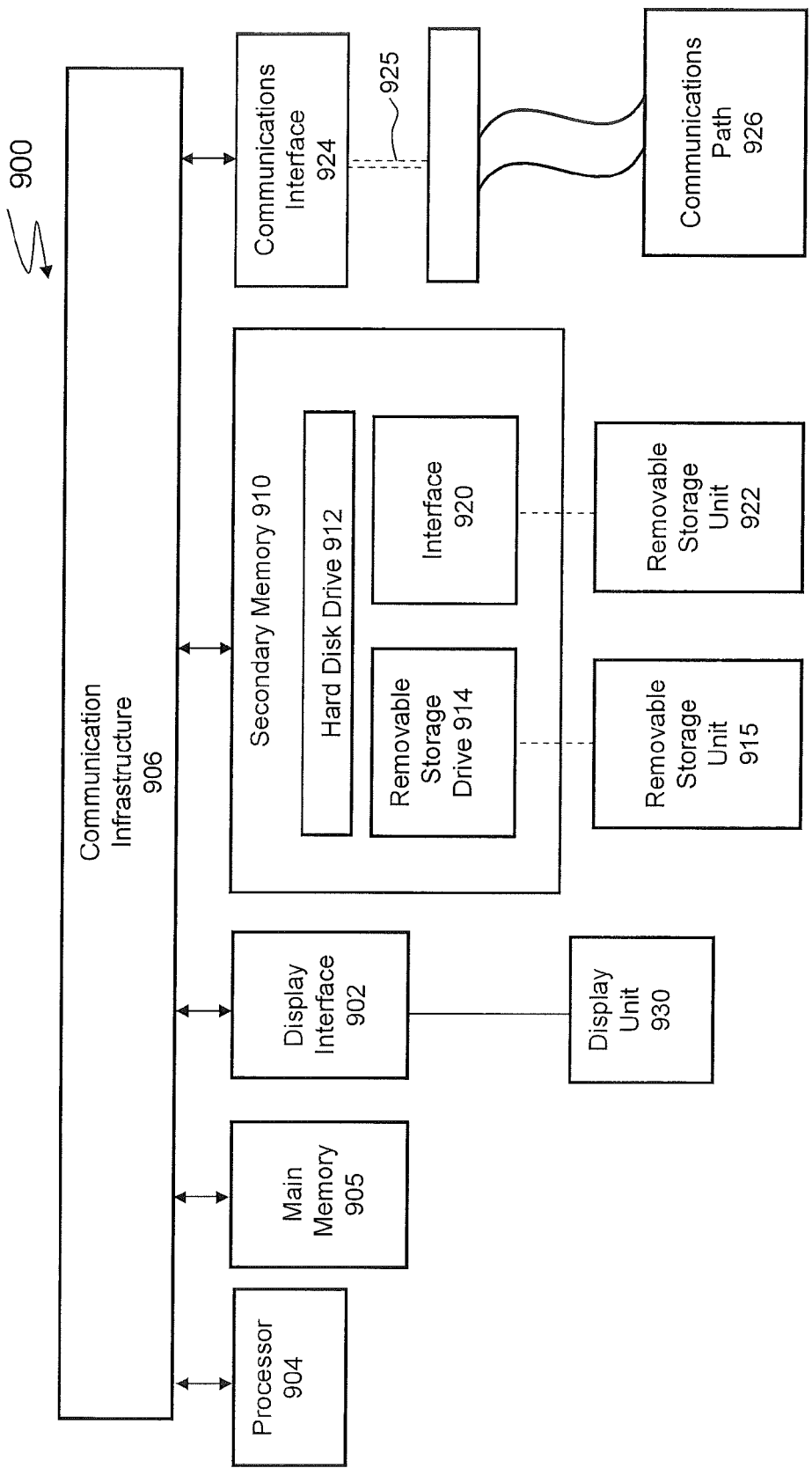
FIG. 9 illustrates a computer system that may be used according to the present invention.

FIG. 9 illustrates an exemplary computer system 900, or network architecture, that may be used to implement the methods according to the present invention. One or more computer systems 900 may carry out the methods presented herein as computer code. One or more processors, such as processor 904, which may be a special purpose or a general-purpose digital signal processor, is connected to a communications infrastructure 906 such as a bus or network. Computer system 900 may further include a display interface 902, also connected to communications infrastructure 906, which forwards information such as graphics, text, and data, from the communication infrastructure 906 or from a frame buffer (not shown) to display unit 930. Computer system 900 also includes a main memory 905, for example random access memory (RAM), read-only memory (ROM), mass storage device, or any combination thereof. Computer system 900 may also include a secondary memory 910 such as a hard disk drive 912, a removable storage drive 914, an interface 920, or any combination thereof. Computer system 900 may also include a communications interface 924, for example, a modem, a network interface (such as an Ethernet card), a communications port, a PCMCIA slot and card, wired or wireless systems, etc.

It is contemplated that the main memory 905, secondary memory 910, communications interface 924, or a combination thereof function as a computer usable storage medium, otherwise referred to as a computer readable storage medium, to store and/or access computer software and/or instructions.

Removable storage drive 914 reads from and/or writes to a removable storage unit 915. Removable storage drive 914 and removable storage unit 915 may indicate, respectively, a floppy disk drive, magnetic tape drive, optical disk drive, and a floppy disk, magnetic tape, optical disk, to name a few.

In alternative embodiments, secondary memory 910 may include other similar means for allowing computer programs or other instructions to be loaded into the computer system 900, for example, an interface 920 and a removable storage unit 922. Removable storage units 922 and interfaces 920 allow software and instructions to be transferred from the removable storage unit 922 to the computer system 900 such as a program cartridge and cartridge interface (such as that found in video game devices), a removable memory chip (such as an EPROM, or PROM) and associated socket, etc.

Communications interface 924 allows software and instructions to be transferred between the computer system 900 and external devices. Software and instructions transferred by the communications interface 924 are typically in the form of signals 925 which may be electronic, electromagnetic, optical or other signals capable of being received by the communications interface 924. Signals 925 are provided to communications interface 924 via a communications path 926. Communications path 926 carries signals 925 and may be implemented using wire or cable, fiber optics, a phone line, a cellular phone link, a Radio Frequency ("RF") link or other communications channels.

Computer programs, also known as computer control logic, are stored in main memory 905 and/or secondary memory 910. Computer programs may also be received via communications interface 924. Computer programs, when executed, enable the computer system 900, particularly the processor 904, to implement the methods according to the present invention. The methods according to the present invention may be implemented using software stored in a computer program product and loaded into the computer system 900 using removable storage drive 914, hard drive 912 or communications interface 924. The software and/or computer system 900 described herein may perform any one of, or any combination of, the steps of any of the methods presented herein. It is also contemplated that the methods according to the present invention may be performed automatically, or may be invoked by some form of manual intervention The invention is also directed to computer products, otherwise referred to as computer program products, to provide software to the computer system 900. Computer products store software on any computer useable medium. Such software, when executed, implements the methods according to the present invention. Embodiments of the invention employ any computer useable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

The computer system 900, or network architecture, of FIG. 9 is provided only for purposes of illustration, such that the present invention is not limited to this specific embodiment. It is appreciated that a person skilled in the relevant art knows how to program and implement the invention using any computer system or network architecture.

The invention is also directed to computer products (also called computer program products) comprising software stored on any computer useable medium. Such software, when executed, at least in part, in one or more data processing devices, causes the data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A computer system method for matching an utterance of a user to a template comprising the steps of:
   (a) receiving by a processor the utterance from an input device, wherein the utterance includes at least one word;
   (b) accessing a set of template hierarchies from a database, wherein the set includes at least one template;
   (c) comparing by the processor the at least one word of the utterance to the at least one term of a template hierarchy in the set of template hierarchies;

(d) determining by the processor whether the at least one word of the utterance matches the at least one term of the template hierarchy;

(e) calculating by the processor a score based on the match between the at least one word of the utterance and the at least one term of the template hierarchy;

(f) repeating steps (c)-(e) until there are no more words of the utterance for said comparing step;

(g) populating the at least one template with at least one data element corresponding to the at least one term of the template hierarchy to obtain a populated template;

(h) computing a total score based on the match between all words of the utterance to the populated template;

(i) selecting by the processor the at least one template with the highest total score;

(j) recording the populated template; and (k) communicating the populated template to the user.

2. The computer system method of claim 1 wherein the total score determines the generation of at least one selected from the group of a narrative template and a report template.

3. The computer system method of claim 2 wherein the report template further includes at least one narrative template.

4. The computer system method of claim 1 wherein said communicating step further comprises the step of presenting audibly the template.

5. The computer system method of claim 1 wherein said communicating step further comprises the step of presenting visually the template.

6. The computer system method of claim 1 wherein the match is at least one exact, inexact, and partial match between the at least one word of the utterance and the at least one term of the template hierarchy.

7. The computer system method of claim 1 wherein the template hierarchy includes at least one sub-hierarchy of terms.

8. The computer system method of claim 1 wherein the input device is a microphone.

9. The computer system method of claim 1 wherein the database is located on a memory of a local computer.

10. The computer system method of claim 1 wherein the database is located on a memory of a remote computer.

11. The computer system method of claim 1 wherein said selecting step further comprises the step of classifying two or more populated templates according to one or more exact matches, inexact matches and partial matches.

12. The computer system method of claim 1 wherein said calculating step further comprises the steps of:

(i) representing a term in the template hierarchy as a term vector;

(ii) obtaining an utterance term vector based on the match between a word of the utterance and a term of the template hierarchy;

(iii) providing a score for the term of the template hierarchy based on the match between the term vector and utterance term vector;

(iv) repeating steps (i)-(iii) until there are no more words of the utterance for said comparing step; and (v) selecting the term of the template hierarchy with the highest score.

13. The computer system method of claim 12, wherein said computing step further comprises the steps of:

(i) intersecting each term vector with each utterance term vector;

(ii) calculating a dot product term vector from said intersecting step; and (iii) providing a total score based on said calculating step.

14. A computer system for matching an utterance of a user to a template, comprising:

a processor, an input device, a memory, a database and a program including instructions, wherein said program resides in said memory and said processor configured to execute said program including said instructions:

the utterance received by said input device and entered into said memory;

said program including instructions to access a set of template hierarchies from said database, wherein the set includes at least one template;

said program including a matching algorithm instructing said processor to compare words of the utterance to terms of the template hierarchy to determine a match between the words and terms;

said matching algorithm instructing said processor to calculate a score based on the match between the words of the utterance to terms of the template;

said matching algorithm instructing said processor to populate at least one template with data elements of said database that correspond to the terms of the template hierarchy to obtain a populated template;

said matching algorithm instructing said processor to compute a total score based on the match between all words of the utterance to the populated template;

said matching algorithm instructing said processor to select at least one template with the highest total score;

said program including instructions to record the populated template into said memory; and said program including instructions to communicate the populated template to the user.

15. The computer system of claim 14 wherein the total score determines the generation of at least one narrative template and report template.

16. The computer system of claim 14 wherein the input device is a microphone.

17. The computer system of claim 14 wherein the populated template is presented audibly through a speaker.

18. The computer system of claim 14 wherein the populated template is presented visually through a display device.

19. The computer system of claim 14 wherein the matching algorithm determines a match based on at least one exact, inexact, and partial match between the words of the utterance and terms of the template hierarchy.

20. The computer system of claim 14 wherein the template hierarchy includes at least one sub-hierarchy of terms.

\* \* \* \* \*